(12) United States Patent
Desaki et al.

(10) Patent No.: US 11,142,252 B2
(45) Date of Patent: Oct. 12, 2021

(54) UPPER VEHICLE-BODY STRUCTURE

(71) Applicant: Mazda Motor Corporation, Hiroshima (JP)

(72) Inventors: Yusuke Desaki, Hiroshima (JP); Makoto Morimoto, Hiroshima (JP); Shuji Muraoka, Iwakuni (JP); Tomomi Nishimori, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/819,209

(22) Filed: Mar. 16, 2020

(65) Prior Publication Data

US 2020/0385064 A1    Dec. 10, 2020

(30) Foreign Application Priority Data

Jun. 5, 2019  (JP) .............................. JP2019-105580

(51) Int. Cl.
*B62D 25/02* (2006.01)
*B62D 25/06* (2006.01)
*B62D 27/02* (2006.01)

(52) U.S. Cl.
CPC ............. *B62D 25/02* (2013.01); *B62D 25/06* (2013.01); *B62D 27/02* (2013.01)

(58) Field of Classification Search
CPC ... B62D 25/02; B60J 5/04; B60J 5/042; B60J 5/043; B60J 5/0433; B60J 5/0479

USPC ............................... 296/203.01, 203.03, 202
See application file for complete search history.

(56) References Cited

U.S. PATENT DOCUMENTS

| | | | |
|---|---|---|---|
| 9,452,786 B2 * | 9/2016 | Hida ...................... | B62D 25/02 |
| 2003/0006629 A1 * | 1/2003 | Kimura ................. | B60K 15/05 |
| | | | 296/203.03 |

FOREIGN PATENT DOCUMENTS

JP        2009-57032 A       3/2009

* cited by examiner

*Primary Examiner* — Dennis H Pedder
(74) *Attorney, Agent, or Firm* — Xsensus LLP

(57) ABSTRACT

An upper vehicle-body structure including: a pair of left and right roof side rails; strikers to which upper portions of rear doors are engaged; a second roof reinforcement that couples the roof side rails to each other at substantially same locations as the strikers; striker mounting members on which the strikers are mounted; and reinforcement members that overlap with the roof side rails from vehicle-width-direction outer sides at substantially same locations as the striker mounting members, in which the reinforcement members each have a lower end located on a vehicle upper side than a joining location between each of the striker mounting members and each of the roof side rails and are joined to the roof side rails overlapping with the reinforcement members in a vehicle up-down direction.

17 Claims, 8 Drawing Sheets

UPPER VEHICLE-BODY STRUCTURE

CROSS-REFERENCE TO RELATED APPLICATION

The present application contains subject matter related to Japanese Priority Application 2019-105580, filed in the Japanese Patent Office on Jun. 5, 2019, the entire contents of which being incorporated herein by reference in its entirety.

BACKGROUND

Field

The present disclosure relates to an upper vehicle-body structure in a vehicle in which the doorway from which an occupant rides and gets out of the vehicle is covered with clamshell side doors, for example.

Description of the Related Art

Examples of a vehicle such as an automobile include a vehicle in which a doorway, which is provided on a side portion of the vehicle and from which an occupant rides and gets out of the vehicle, is covered with a front door supported by the vehicle body so as to be openable and closable, or a vehicle in which the doorway is covered with a front door and a rear door supported by the vehicle body so as to be openable and closable.

The opening of the doorway of the vehicle including the front door and the rear door is larger than that of the vehicle only including the front door, and hence the vehicle body rigidity easily decreases as compared to the vehicle only including the front door.

Therefore, the vehicle including the front door and the rear door secures the vehicle body rigidity by providing a center pillar joined to the vehicle body so as to partition the front portion and the rear portion of the doorway as in Japanese Patent Laid-Open No. 2009-57032, for example.

Examples of the vehicle including the front door and the rear door include a vehicle including so-called clamshell side doors formed by a front door that forms the front edge of the doorway and is supported by the vehicle body so as to be openable and closable, and a rear door that forms the rear edge of the doorway and is supported by the vehicle body so as to be openable and closable, for example.

In the vehicle including the clamshell side doors as above, a large opening is secured for the doorway. Therefore, in many cases, the vehicle does not include a center pillar as that in Japanese Patent Laid-Open No. 2009-57032. Therefore, in the vehicle including the clamshell side doors, a structure replacing the center pillar is built in the rear portion of the front door or the front portion of the rear door.

The vehicle including the clamshell side doors secures the vehicle body rigidity that is substantially equivalent to that of the vehicle including the center pillar by engaging the structure replacing the center pillar with a roof side rail forming the upper edge of the doorway via an engaging member such as a striker, for example.

Regarding the vehicle including the front door and the rear door described above, when a colliding object collides with the side of the vehicle, the collision load from the side of the vehicle acts on the vehicle body as a load that deforms the roof side rail to be bent to the vehicle-width-direction inner side.

Thus, in Japanese Patent Laid-Open No. 2009-57032, the bending deformation of the roof side rail to the vehicle-width-direction inner side is suppressed when the collision load is applied from the side of the vehicle by arranging a reinforcement pipe extending in the vehicle front-rear direction in the internal space of the roof side rails.

However, in the vehicle including the clamshell side doors, the collision load from the side of the vehicle locally acts on the roof side rail via the engaging member. Therefore, as compared to the vehicle including the center pillar, the roof side rail tends to easily deform so as to be bent to the vehicle-width-direction inner side.

Therefore, when the roof side rail of the vehicle including the clamshell side doors is reinforced with the reinforcement pipe in Japanese Patent Laid-Open No. 2009-57032, the thickness of the reinforcement pipe needs to be increased so as to increase the rigidity thereof as compared to the reinforcement pipe applied to the vehicle including the center pillar. As a result, there has been a fear in that the vehicle weight increases in contradiction to the recent needs for suppressing the increase of the vehicle weight from the viewpoint of improving fuel efficiency and motion performance.

In view of the problem described above, an object of the present disclosure is to provide an upper vehicle-body structure capable of suppressing the increase of the vehicle weight and the bending deformation of the roof side rails to the vehicle-width-direction inner side.

SUMMARY

An upper vehicle-body structure including: a pair of left and right roof side rails extending in a vehicle front-rear direction of a vehicle; engaging members to which upper portions of side doors of the vehicle are engaged; a roof reinforcement that couples the left and right roof side rails to each other in a vehicle width direction at substantially same locations as the engaging members in the vehicle front-rear direction; mounting members that are joined to the roof side rails and the roof reinforcement and on which the engaging members are mounted; and substantially plate-like reinforcement members that overlap with the roof side rails from vehicle-width-direction outer sides at substantially same locations as the mounting members in the vehicle front-rear direction. In the upper vehicle-body structure, the reinforcement members each have a lower end that is located on a vehicle upper side at a location higher than a joining location between each of the mounting members and each of the roof side rails in a vertical up-down direction from a bottom of the vehicle to a top of the vehicle, and the reinforcement members are joined to the roof side rails in a manner in which the reinforcement members overlap with the roof side rails and are external to the external surface of the roof side rails.

As a result, the increase of the vehicle weight can be suppressed and the bending deformation of the roof side rails to the vehicle-width-direction inner side can be suppressed.

Specifically, the upper vehicle-body structure can suppress the displacement of the roof side rail to the vehicle-width-direction inner side by the reinforcement member that is lighter in weight than a substantially pipe-like reinforcement member when the collision load from the side of the vehicle acts on the roof side rail via the mounting member by joining the reinforcement member to the roof side rail from the vehicle-width-direction outer side.

At this time, the reinforcement member is joined to the roof side rail that overlaps with the reinforcement member in the vehicle up-down direction. Therefore, the upper vehicle-body structure can cause the collision load from the side of the vehicle to act on the joining location as a shearing force that shears the joining location between the roof side rail and the reinforcement member.

In other words, the collision load from the side of the vehicle displaces the roof side rail to the vehicle-width-direction inner side against the joining strength between the roof side rail and the reinforcement member. Therefore, the upper vehicle-body structure can effectively suppress the displacement of the roof side rail to the vehicle-width-direction inner side.

As a result, the upper vehicle-body structure can reduce the displacement amount of the roof side rail on the vehicle-width-direction outer side serving as the compressive deformation side more than when the collision load from the side of the vehicle acts on the mounting member via the engaging member.

The lower end of the reinforcement member is located higher on the vehicle upper side than the joining location between the mounting member and the roof side rail, and hence the upper vehicle-body structure can suppress a case where the collision load from the side of the vehicle acting on the engaging member is directly transmitted to the reinforcement member via the mounting member.

Therefore, the upper vehicle-body structure can stably transmit the collision load from the side of the vehicle acting on the engaging member to the roof reinforcement via the mounting member.

Therefore, the upper vehicle-body structure can suppress the increase of the vehicle weight and suppress the bending deformation of the roof side rail to the vehicle-width-direction inner side.

In an exemplary embodiment, when considering the roof reinforcement as a first roof reinforcement, a second roof reinforcement that couples the roof side rails to each other in the vehicle width direction at locations more forward of the vehicle than the first roof reinforcement may be included, and each of the reinforcement members may include: a reinforcement main body portion having a front end located between the first roof reinforcement and the second roof reinforcement; and a reinforcement front portion provided so as to extend from an upper portion of the reinforcement main body portion to the vehicle front side.

The upper vehicle-body structure can suppress the occurrence of the stress concentration caused by providing the reinforcement member, and can suppress the bending deformation of the roof side rail due to the collision load from the side of the vehicle and the bending deformation of the roof side rail due to the load from the vehicle upper side.

Specifically, the load from the vehicle upper side may act on the roof side rail not only by the collision load from the side of the vehicle, but also by the rollover of the vehicle, for example.

In particular, the rigidity of the roof side rail between the first roof reinforcement and the second roof reinforcement is lower than the rigidity of the location surrounding the first roof reinforcement and the location surrounding the second roof reinforcement. Therefore, there is a fear that the roof side rail may be deformed so as to be bent to the vehicle lower side by the load from the vehicle upper side.

By the reinforcement main body portion having a front end located between the first roof reinforcement and the second roof reinforcement, and the reinforcement front portion provided so as to extend from the upper portion of the reinforcement main body portion to the vehicle front side, the upper vehicle-body structure can improve the rigidity of the roof side rail between the first roof reinforcement and the second roof reinforcement.

The reinforcement front portion is provided so as to extend from the upper portion of the reinforcement main body portion. Therefore, the upper vehicle-body structure can reinforce a relatively upper portion of the roof side rail between the first roof reinforcement and the second roof reinforcement by the reinforcement member. Therefore, the upper vehicle-body structure can stably secure the rigidity of the roof side rail against the load from the vehicle upper side.

The rigidity of the roof side rail can be gradually reduced from the first roof reinforcement to the second roof reinforcement, and hence the upper vehicle-body structure can prevent a stress concentration section from being generated between the first roof reinforcement and the second roof reinforcement.

Therefore, the upper vehicle-body structure can suppress the occurrence of stress concentration caused by providing the reinforcement member, and can suppress the bending deformation of the roof side rail caused by the collision load from the side of the vehicle and the bending deformation of the roof side rail caused by the load from the vehicle upper side.

In an exemplary embodiment, the roof side rails may each be formed in a shape having a plurality of ridgelines extending in the vehicle front-rear direction, the reinforcement main body portion of the reinforcement member may be formed in a shape having a plurality of main body ridgelines that overlap with the plurality of ridgelines, the reinforcement front portion of the reinforcement member may be formed in a shape having a front portion ridgeline, which is continuous with a main body ridgeline located on the vehicle upper side out of the plurality of main body ridgelines and overlaps with one of the ridgelines of the roof side rail.

In an exemplary embodiment, the upper vehicle-body structure can stably reinforce the roof side rail in a place between the first roof reinforcement and the second roof reinforcement even with the reinforcement front portion of which cross-sectional area in the vertical cross-section along the vehicle width direction is smaller than that of the reinforcement main body portion.

Therefore, the upper vehicle-body structure can suppress the stress concentration caused by the collision load from the side of the vehicle and the load from the vehicle upper side, and secure the rigidity of the roof side rail in a more secure manner.

Therefore, the upper vehicle-body structure can suppress the bending deformation of the roof side rail caused by the collision load from the side of the vehicle and the bending deformation of the roof side rail caused by the load from the vehicle upper side in a more secure manner.

The upper vehicle-body structure is capable of suppressing the increase of the vehicle weight and the bending deformation of the roof side rails to the vehicle-width-direction inner side.

DETAILED DESCRIPTION

Exemplary embodiments are described with reference to the drawings below.

In an exemplary embodiment, a vehicle body is a vehicle in which side doors that close the doorway from which an occupant rides and gets out of the vehicle are a clamshell type. The upper vehicle-body structure in the vehicle as above is described in detail with reference to FIG. 1 to FIG. 8.

Figure 1:
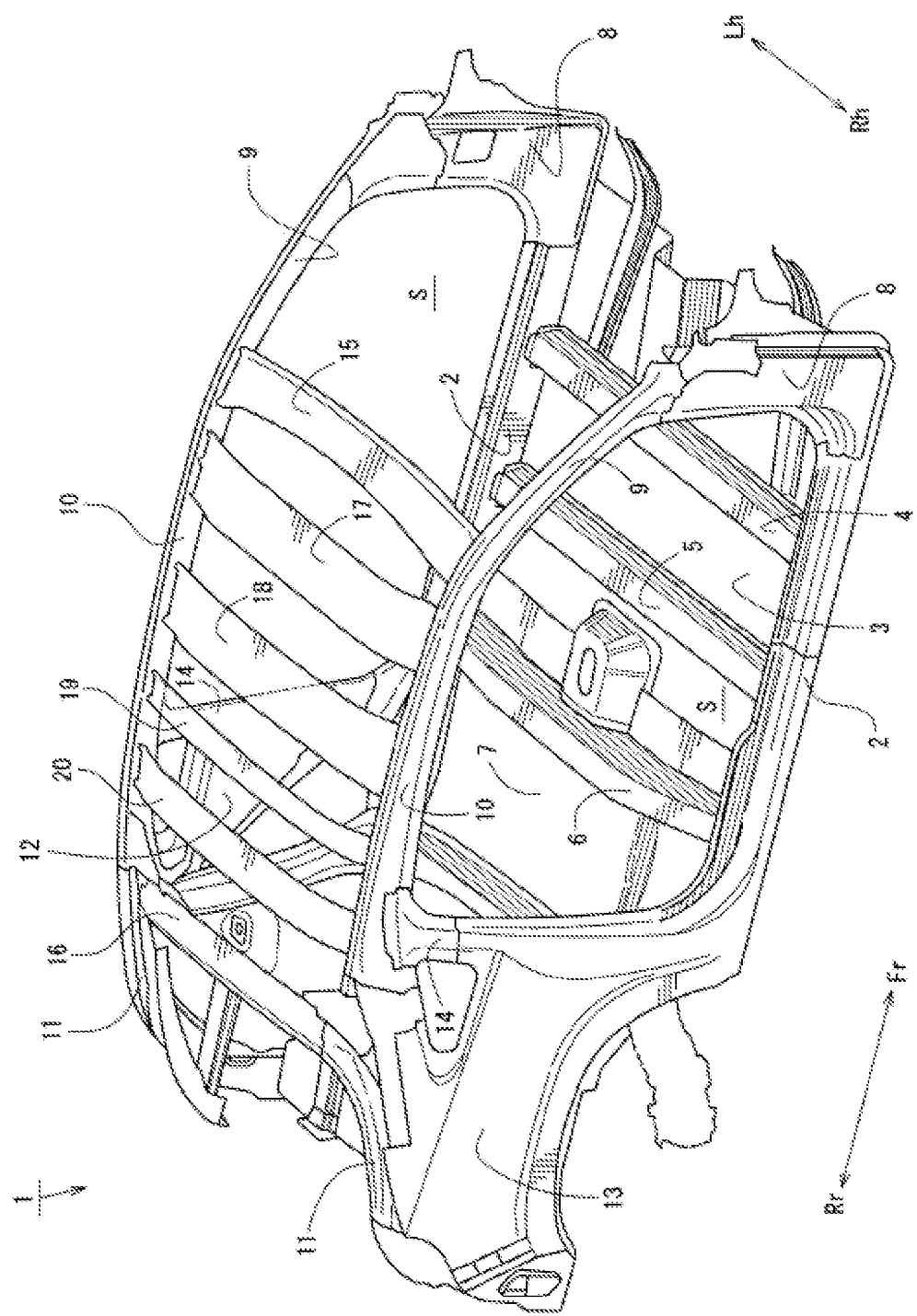
FIG. 1 is an external perspective view illustrating the external appearance of a vehicle seen from the front side and the upper side of the vehicle.
Figure 2:
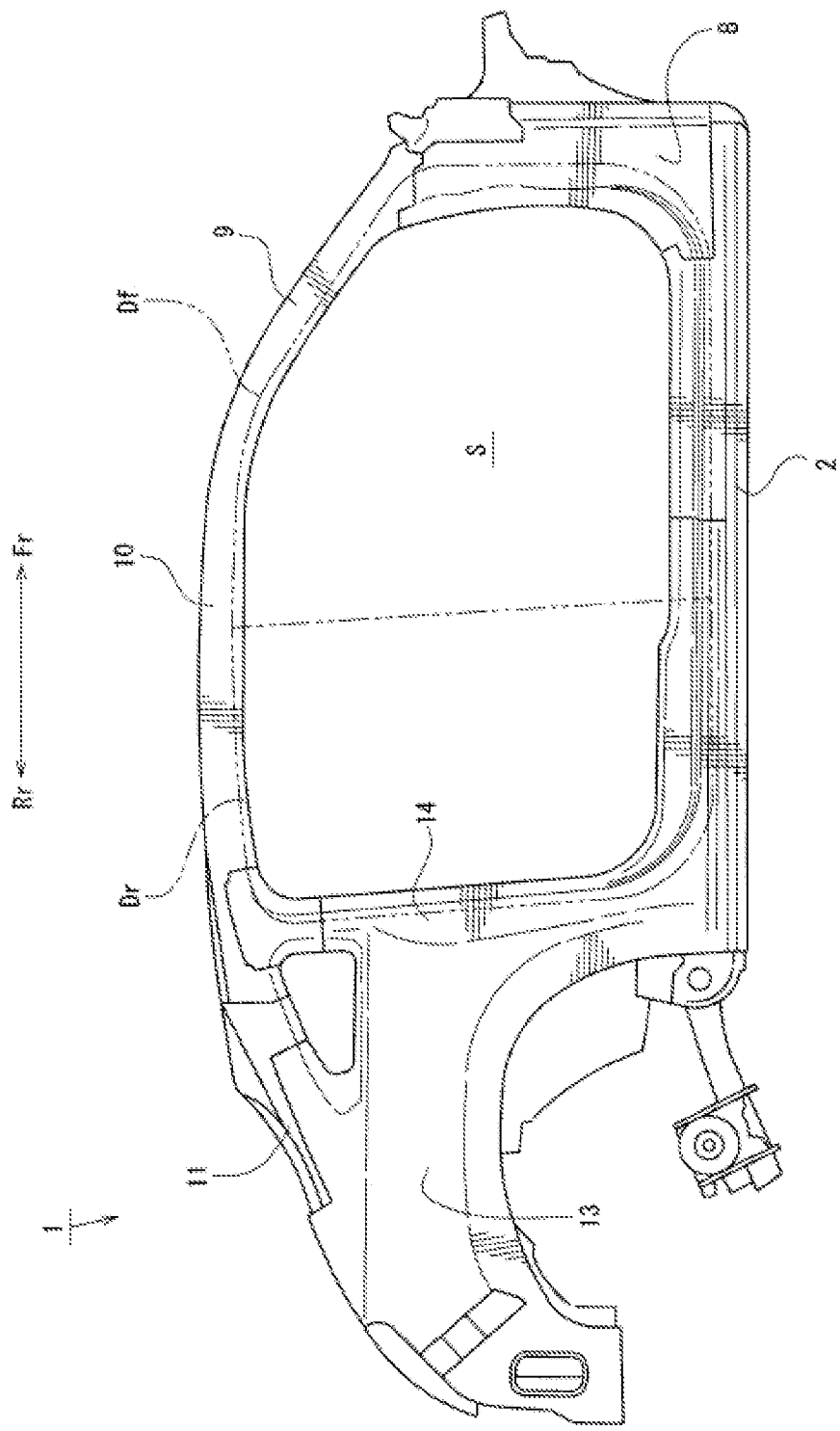
FIG. 2 is a right side view illustrating a vehicle-body side of the vehicle seen from the right side.
Figure 3:
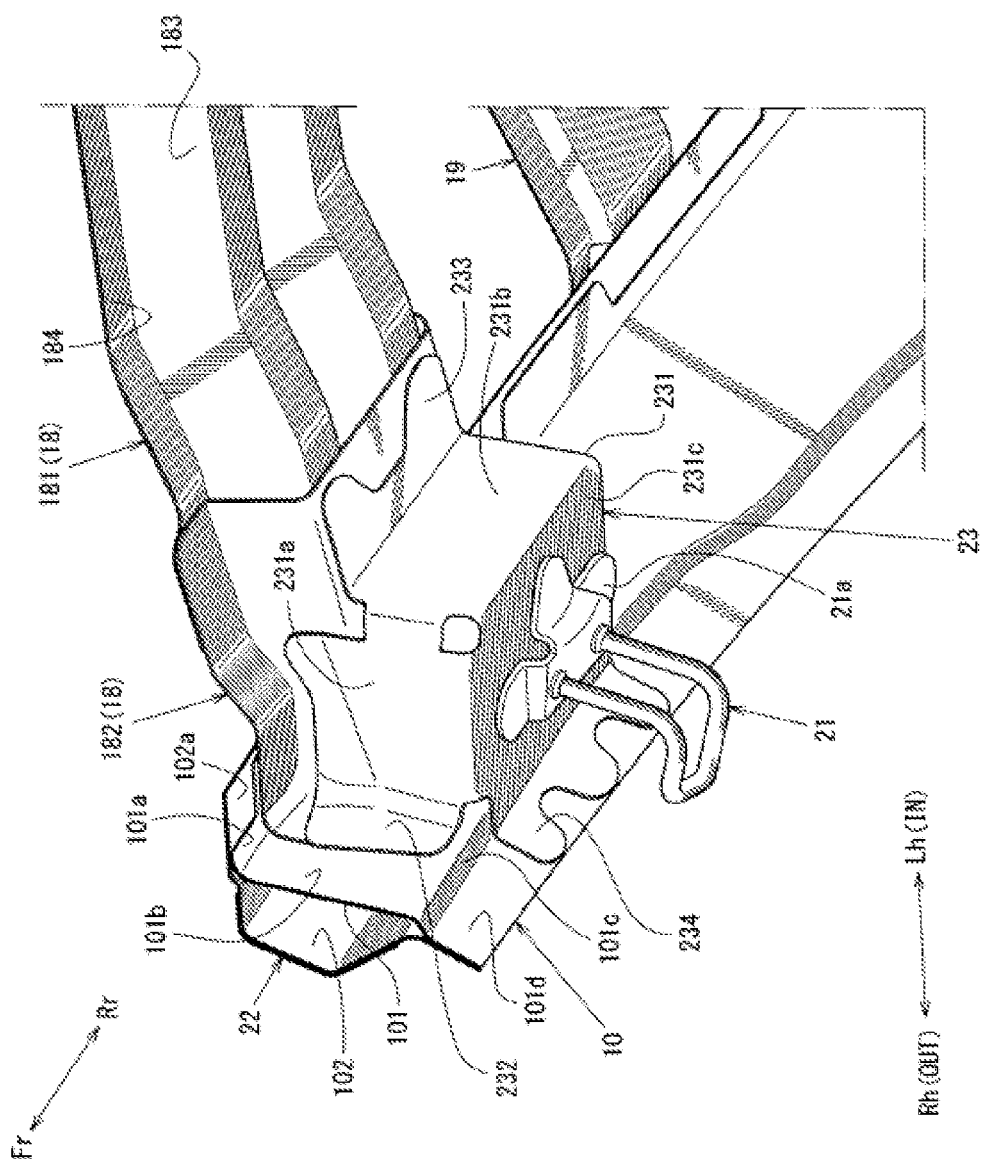
FIG. 3 is an external perspective view illustrating the external appearance of the surroundings of a striker mounting member seen from the inside of a vehicle interior.
Figure 4:
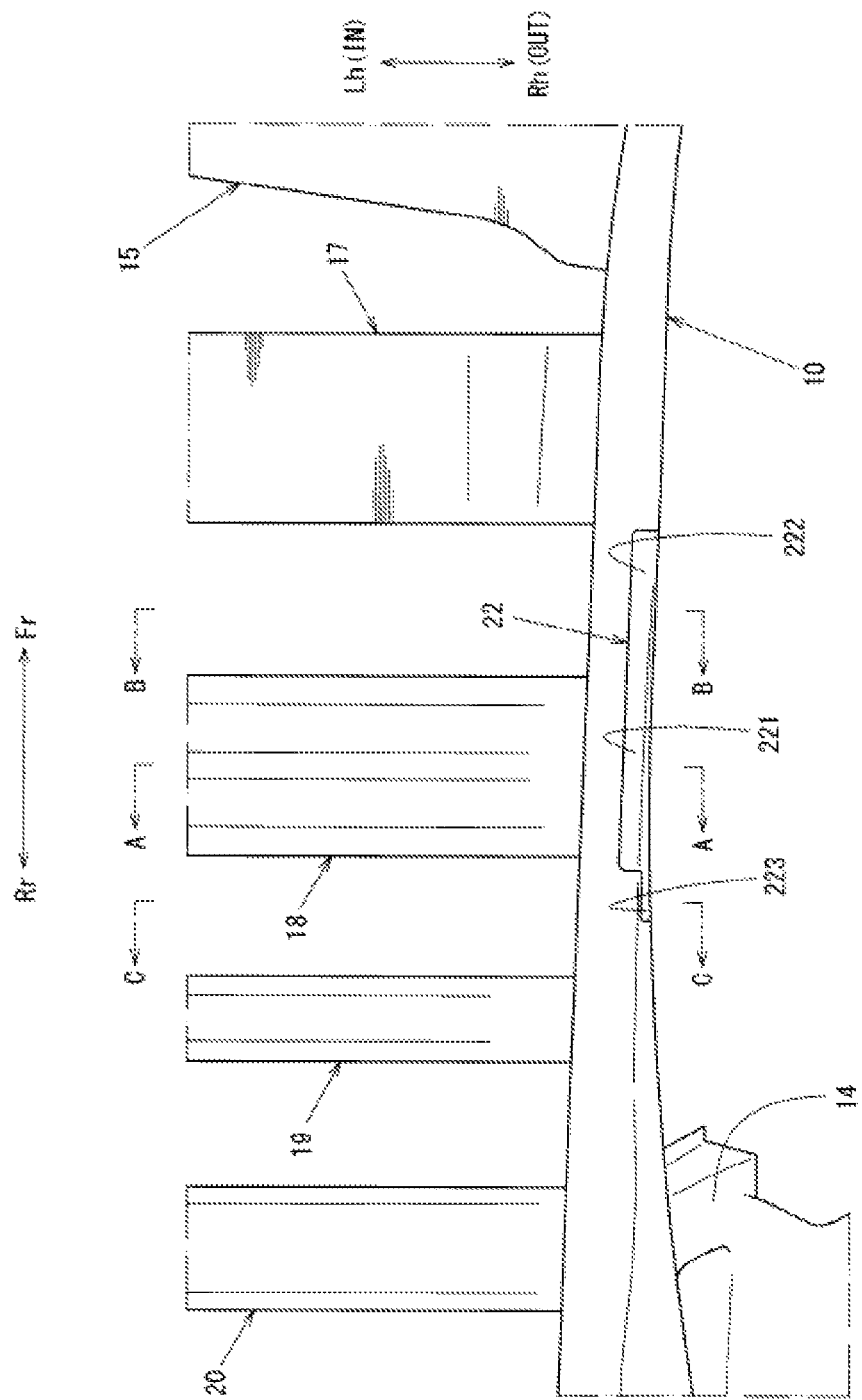
FIG. 4 is a plan view illustrating the external appearance of a roof side rail.
Figure 5:
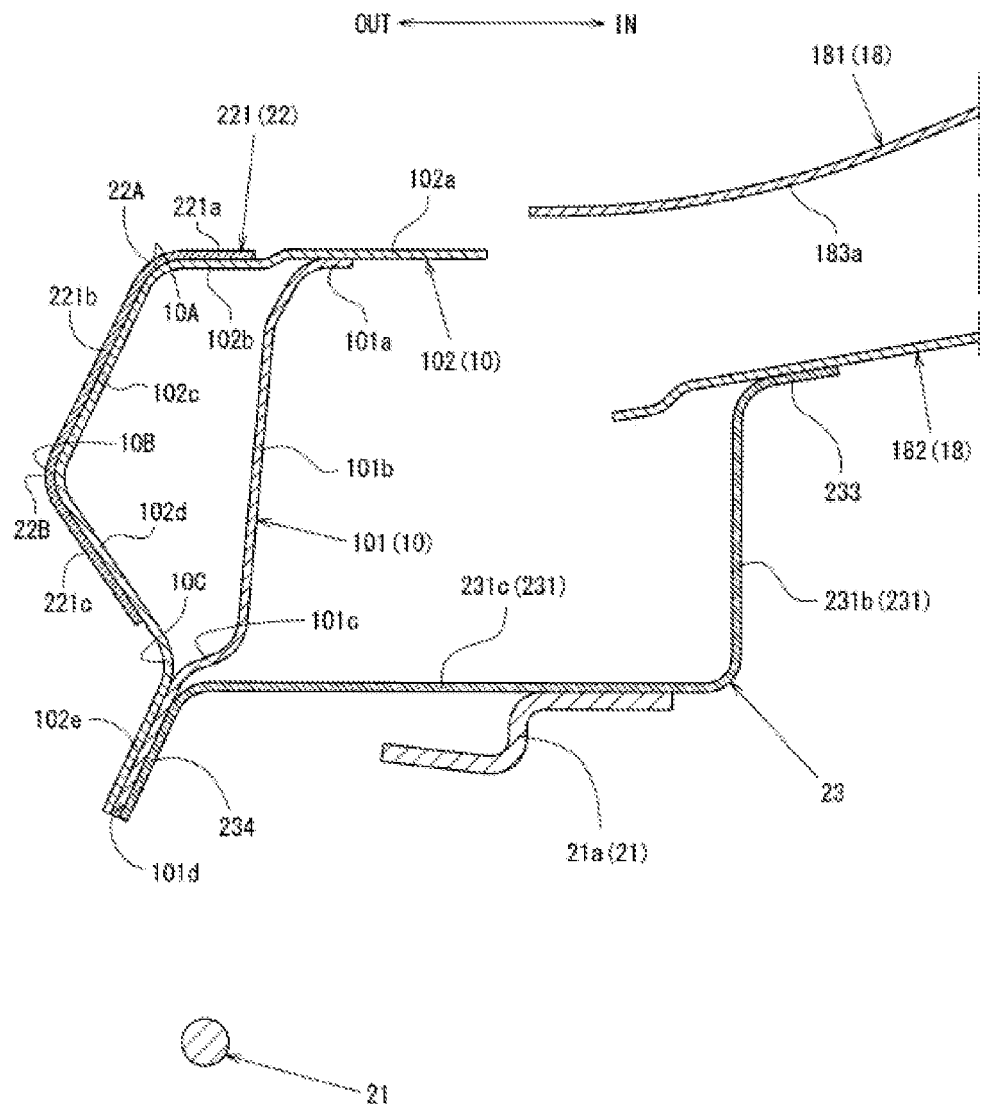
FIG. 5 is a cross-sectional view taken along and seen from arrows A-A in FIG. 4.

Note that FIG. 1 illustrates an external perspective view of a vehicle 1 seen from the front side and the upper side of the vehicle, FIG. 2 illustrates a right side view of the vehicle 1 seen from the right side, FIG. 3 illustrates an external perspective view of the surroundings of a striker mounting member 23 seen from the inside of a vehicle interior, FIG. 4 illustrates a plan view of a roof side rail 10, and FIG. 5 illustrates a cross-sectional view taken along and seen from arrows A-A in FIG. 4.

Figure 6:
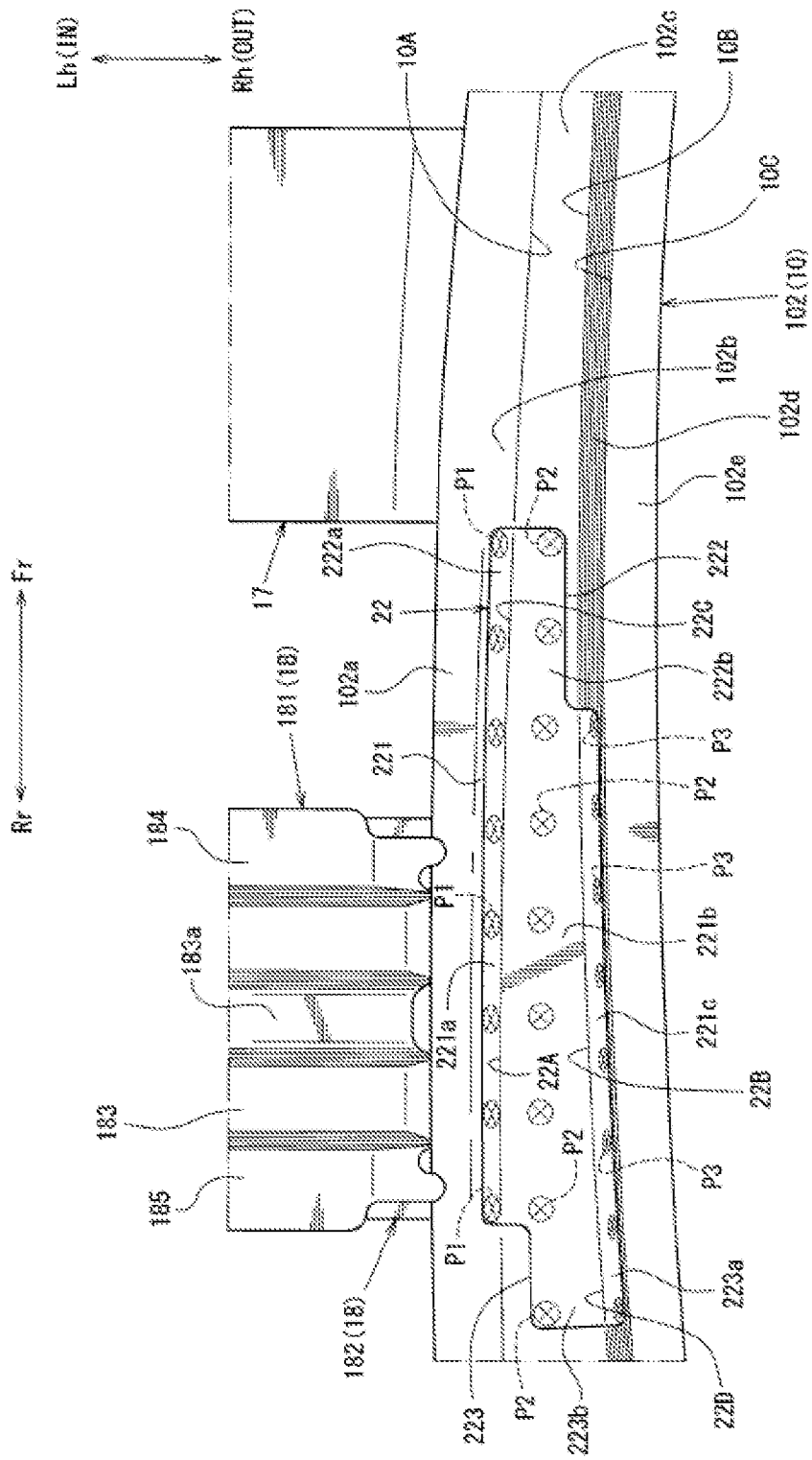
FIG. 6 is an external perspective view illustrating the external appearance of a reinforcement member diagonally seen from the upper side of the vehicle.
Figure 7:
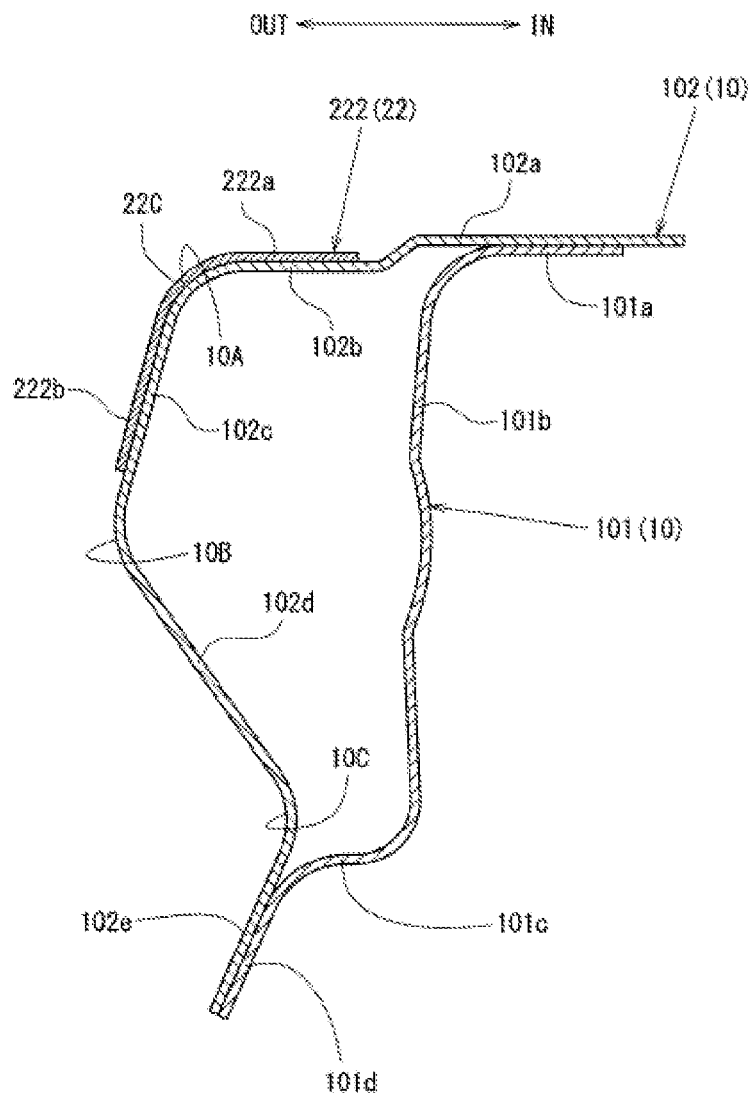
FIG. 7 is a cross-sectional view taken along and seen from arrows B-B in FIG. 4.
Figure 8:
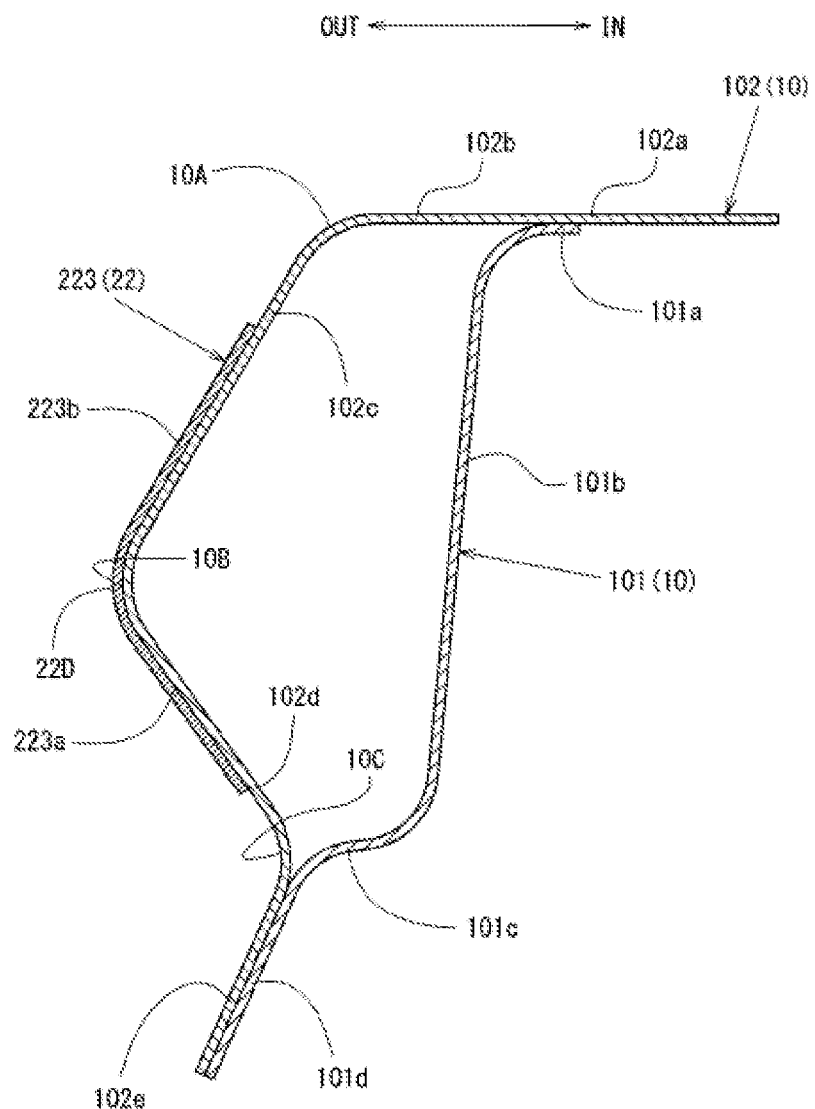
FIG. 8 is a cross-sectional view taken along and seen from arrows C-C in FIG. 4.

FIG. 6 illustrates an external perspective view of a reinforcement member 22 diagonally seen from the upper side of the vehicle; FIG. 7 illustrates a cross-sectional view taken along and seen from arrows B-B in FIG. 4; and FIG. 8 illustrates a cross-sectional view taken along and seen from arrows C-C in FIG. 4.

In order to clarify the illustration, the illustration of a front door and a rear door is omitted in FIG. 1, and the front door and the rear door are illustrated by two-dot chain lines in FIG. 2.

In the drawings, arrow Fr and arrow Rr indicate the front-rear direction, arrow Fr indicates the front side, and arrow Rr indicates the rear side. Arrow Rh and arrow Lh, and arrow IN and arrow OUT indicate the vehicle width direction, arrow Rh indicates the right direction, arrow Lh indicates the left direction, arrow IN indicates the vehicle-width-direction inner side, and arrow OUT indicates the vehicle-width-direction outer side.

As illustrated in FIG. 1, the vehicle 1 includes a pair of left and right side sills 2 extending on a lower portion of the vehicle 1 in the vehicle front-rear direction, a front floor panel 3 forming a floor surface of the vehicle interior between the left and right side sills 2, a first floor cross member 4 and a second floor cross member 5 that couple the left and right side sills 2 to each other in the vehicle width direction, a kick-up portion 6 raised up from the rear end of the front floor panel 3 to the vehicle upper side, and a rear floor panel 7 disposed on the vehicle rear side of the kick-up portion 6.

As illustrated in FIG. 1 and FIG. 2, the vehicle 1 includes a pair of left and right hinge pillars 8 extending to the vehicle upper side from the front ends of the side sills 2, a pair of left and right front pillars 9 extending to the vehicle upper-rear side from the upper ends of the hinge pillars 8, a pair of left and right roof side rails 10 extending to the vehicle rear side from the upper ends of the front pillars 9, and a pair of left and right rear pillars 11 extending to the vehicle lower-rear side from the rear ends of the roof side rails 10.

As illustrated in FIG. 1 and FIG. 2, the vehicle 1 includes, on the vehicle upper side of a rear side frame (not shown) extending to the vehicle rear side from the rear ends of the side sills 2, a pair of left and right rear side panels 12 forming the inner walls of the vehicle interior, a pair of left and right body side outer panels 13 that are external design surfaces that cover the rear side panels 12 from the vehicle-width-direction outer side, and side pillars 14 that couple the rear ends of the side sills 2 and the roof side rails 10 to each other in the vehicle up-down direction.

As illustrated in FIG. 1 and FIG. 2, the vehicle 1 forms an opening surrounded by the side sill 2, the hinge pillar 8, the front pillar 9, the roof side rail 10, and the side pillar 14 as a side door opening S from which an occupant rides and gets out of the vehicle. As illustrated by the two-dot chain lines in FIG. 2, the side door opening S is covered by a front door Df supported by the hinge pillar 8 so as to be openable and closable and a rear door Dr supported by the side pillar 14 so as to be openable and closable.

As illustrated in FIG. 1, in the upper vehicle body of the vehicle 1 as above, a front header 15 that couples the front pillars 9 to each other in the vehicle width direction, a rear header 16 that couples the rear pillars 11 to each other in the vehicle width direction, and a first roof reinforcement 17, a second roof reinforcement 18, a third roof reinforcement 19, and a fourth roof reinforcement 20 that couple the roof side rails 10 to each other in the vehicle width direction are disposed.

When the components described above are described in further detail, the side sill 2 is a closed cross-section member that forms a vehicle body framework in the lower vehicle body of the vehicle 1, and is formed by a side sill outer portion located on the vehicle-width-direction outer side and a side sill inner portion located on the vehicle-width-direction inner side. The side sill 2 is formed so that the cross-sectional shape in a vertical cross section along the vehicle width direction becomes a closed cross section.

As illustrated in FIG. 1, the first floor cross member 4 and the second floor cross member 5 are joined to the upper surface of the front floor panel 3 in the stated order from the vehicle front side. The first floor cross member 4 and the second floor cross member 5 are members forming the vehicle body framework in the lower vehicle body of the vehicle 1 with the front floor panel 3, and are formed in a shape forming a closed cross-section extending in the vehicle width direction with the front floor panel 3.

For example, the first floor cross member 4 and the second floor cross member 5 each have a cross-sectional shape in the vertical cross section along the vehicle front-rear direction that is formed in a substantially hat-like shape in cross section, and are joined to the upper surface of the front floor panel 3.

The hinge pillar 8 is a closed cross-section member forming the vehicle body framework in the front vehicle body of the vehicle 1, and is formed by an outer panel located on the vehicle-width-direction outer side and an inner panel located on the vehicle-width-direction inner side. The hinge pillar 8 is formed so that the cross-sectional shape in the horizontal cross section along the vehicle width direction becomes a closed cross section.

The front pillar 9 is a closed cross-section member forming the vehicle body framework in the upper vehicle body of the vehicle 1, and is formed by an outer panel located on the vehicle-width-direction outer side, and an inner panel located on the vehicle-width-direction inner side. The front pillar 9 is formed so that the cross-sectional shape in the horizontal cross section along the vehicle width direction becomes a closed cross section.

The roof side rail 10 is a closed cross-section member forming the vehicle body framework in the upper vehicle body of the vehicle 1. Note that the roof side rail 10 is described in detail below.

The rear pillar 11 is a closed cross-section member forming the vehicle body framework in the rear vehicle body of the vehicle 1, and is formed by an outer panel located in the vehicle-width-direction outer side, and an inner panel located on the vehicle-width-direction inner side. The rear pillar 11 is formed so that the cross-sectional shape in the vertical cross section along the vehicle width direction becomes a closed cross section.

The side pillar 14 is a member forming the vehicle body framework along the rear edge of the side door opening S with the front portion of the rear side panel 12, and is formed in a shape forming a closed cross section extending in the vehicle up-down direction with the rear side panel 12. For example, the side pillar 14 has a cross-sectional shape in the horizontal cross section along the vehicle width direction that is formed in a substantially hat-like shape in cross section so as to protrude to the vehicle-width-direction outer side, and is joined to the surface of the rear side panel 12 on the vehicle-width-direction outer side thereof.

As illustrated in FIG. 1, the front header 15 couples the joining locations of the front pillars 9 and the roof side rails 10 to each other in the vehicle width direction. The front header 15 is formed by an upper panel located on the vehicle upper side and a lower panel located on the vehicle lower side so that the cross-sectional shape in the vertical cross section along the vehicle front-rear direction becomes a closed cross section.

As illustrated in FIG. 1, the rear header 16 couples the upper ends of the rear pillars 11 to each other in the vehicle width direction. The rear header 16 is formed by an upper panel located on the vehicle upper side and a lower panel located on the vehicle lower side so that the cross-sectional shape in the vertical cross section along the vehicle front-rear direction becomes a closed cross section.

As illustrated in FIG. 1, the first roof reinforcement 17, the second roof reinforcement 18, the third roof reinforcement 19, and the fourth roof reinforcement 20 are disposed in the stated order from the vehicle front side so as to be spaced apart from each other by predetermined spaces in the vehicle front-rear direction between the front header 15 and the rear header 16.

As illustrated in FIG. 1 and FIG. 3, out of the above, the second roof reinforcement 18 couples the roof side rails 10 to each other in the vehicle width direction near the front ends of the rear doors Dr, in more detail, at substantially the same locations as the strikers 21 described below in the vehicle front-rear direction.

The second roof reinforcement 18 is a member forming the vehicle body framework in the upper vehicle body of the vehicle 1 with a roof panel (not shown), and is formed in a shape forming a closed cross section extending in the vehicle width direction with the roof panel (not shown). Note that the second roof reinforcement 18 is described in detail below.

As illustrated in FIG. 1 and FIG. 4, the first roof reinforcement 17 couples the roof side rails 10 to each other in the vehicle width direction between the front header 15 and the second roof reinforcement 18.

As illustrated in FIG. 1 and FIG. 4, the third roof reinforcement 19 couples the roof side rails 10 to each other in the vehicle width direction between the second roof reinforcement 18 and the upper end of the side pillar 14.

As illustrated in FIG. 1 and FIG. 4, the fourth roof reinforcement 20 couples the roof side rails 10 to each other in the vehicle width direction at substantially the same locations as the upper ends of the side pillars 14 in the vehicle front-rear direction.

The front door Df and the rear door Dr are well-known features, and hence detailed illustrations thereof are omitted. The front door Df and the rear door Dr are each formed by a door outer panel forming an external design surface of the vehicle 1 and a door inner panel disposed so as to face the door outer panel on the vehicle-width-direction inner side of the door outer panel.

On the front portion of the rear door Dr, a center pillar (not shown) forming the vehicle body framework in the side vehicle body of the vehicle 1 with the door inner panel is joined to the face of the door inner panel on the vehicle-width-direction outer side thereof. The center pillar is formed in a shape forming a closed cross section extending in the vehicle up-down direction with the door inner panel. For example, the center pillar has a cross-sectional shape in the horizontal cross section along the vehicle width direction that is formed in a substantially hat-like shape in cross section so as to protrude to the vehicle-width-direction outer side.

Although detailed illustrations are omitted, on the front portion and the upper portion of the rear door Dr, a latch to be engaged with the striker 21 (see FIG. 3) described below is provided on a closed cross-section portion formed by the door inner panel and the center pillar.

The vehicle 1 described above forms an annular vehicle body framework that is substantially annular in side view along the side door opening S by the side sill 2, the hinge pillar 8, the front pillar 9, the roof side rail 10, and the side pillar 14.

The vehicle 1 forms an annular vehicle body framework that is substantially annular in front view by the second floor cross member 5, the center pillar of the rear door Dr, and the second roof reinforcement 18.

The roof side rail 10 and the second roof reinforcement 18 described above are described in further detail.

As illustrated in FIG. 3 to FIG. 5, the roof side rail 10 is formed so that the cross-sectional shape in the vertical cross section along the vehicle width direction forms a closed cross section by a roof side inner portion 101 located on the vehicle-width-direction inner side and a roof side outer portion 102 located on the vehicle-width-direction outer side with respect to the roof side inner portion 101.

As illustrated in FIG. 5, the roof side inner portion 101 is integrally formed by an inner upper-side flange portion 101a having a predetermined thickness in the vehicle up-down direction, an inner side wall portion 101b provided so as to extend from the inner upper-side flange portion 101a to the vehicle lower side, an inner lower surface portion 101c provided so as to extend from the lower end of the inner side wall portion 101b to the vehicle-width-direction outer side and slightly to the vehicle lower side, and an inner lower-side flange portion 101d provided so as to extend from an inner lower surface portion 101c to the vehicle-width-direction outer side and the vehicle lower side in the vertical cross section along the vehicle width direction.

Meanwhile, as illustrated in FIG. 5, the roof side outer portion 102 is integrally formed by an outer upper-side flange portion 102a having a predetermined thickness in the vehicle up-down direction, an outer upper surface portion 102b provided so as to extend from the outer upper-side flange portion 102a to the vehicle-width-direction outer side, an outer side wall portion 102c provided so as to extend from the outer upper surface portion 102b to the vehicle lower side and slightly to the vehicle-width-direction outer side, an outer lower surface portion 102d provided so as to extend from the lower end of the outer side wall portion 102c to the vehicle-width-direction inner side and the vehicle lower side, and an outer lower-side flange portion 102e provided so as to extend from the lower end of the outer lower surface portion 102d to the vehicle-width-direction outer side and the vehicle lower side in the vertical cross section along the vehicle width direction.

As illustrated in FIG. 5, the roof side rail 10 has a cross-sectional shape in the vertical cross section along the vehicle width direction that forms a closed cross-section of which cross section is substantially trapezoidal by joining the upper surface of the inner upper-side flange portion 101a and the lower surface of the outer upper-side flange portion 102a to each other and joining the surface of the inner lower-side flange portion 101d on the vehicle-width-direction outer side thereof and the surface of the outer lower-side flange portion 102e on the vehicle-width-direction inner side thereof to each other.

As illustrated in FIG. 5 and FIG. 6, by the configuration as above, in the roof side rail 10, a first ridgeline 10A extending in the vehicle front-rear direction is formed in a corner portion between the outer upper surface portion 102b and the outer side wall portion 102c, a second ridgeline 10B extending in the vehicle front-rear direction is formed in a corner portion between the outer side wall portion 102c and the outer lower surface portion 102d, and a third ridgeline 10C extending in the vehicle front-rear direction is formed in a corner portion between the outer lower surface portion 102d and the outer lower-side flange portion 102e.

As illustrated in FIG. 4 and FIG. 6, in the roof side rail 10, the reinforcement member 22 that reinforces the roof side outer portion 102 from the vehicle-width-direction outer side is joined between the first roof reinforcement 17 and the third roof reinforcement 19. Note that the reinforcement member 22 is described in detail below.

As illustrated in FIG. 3, the second roof reinforcement 18 is formed by a substantially W-shaped roof reinforcement main-body member 181 protruding to the vehicle lower side, and a pair of coupling members 182 joined to both ends of the roof reinforcement main-body member 181.

As illustrated in FIG. 3 and FIG. 6, the roof reinforcement main-body member 181 is integrally formed by a bending structure portion 183 of which cross-sectional shape in the vertical cross section along the vehicle front-rear direction is bent to a substantially W-shape in cross section so as to protrude to the vehicle lower side, a front-side flange portion 184 provided so as to extend from the front end of the bending structure portion 183 to the vehicle front side in a flange-like shape, and a rear-side flange portion 185 provided so as to extend from the rear end of the bending structure portion 183 to the vehicle rear side in a flange-like shape.

The roof reinforcement main-body member 181 forms a closed cross-section extending in the vehicle width direction by joining an upper surface portion 183a that is an upper surface portion formed in substantially the center of the bending structure portion 183 in the vehicle front-rear direction, a front-side flange portion 184, and a rear-side flange portion 185 to the lower surface of the roof panel.

As illustrated in FIG. 6, the roof reinforcement main-body member 181 has a portion provided so as to extend from the front-side flange portion 184 to the vehicle-width-direction outer side and a portion provided so as to extend from the rear-side flange portion 185 to the vehicle-width-direction outer side that are joined to the outer upper surface portion 102b of the roof side rail 10.

As illustrated in FIG. 3, a coupling member 182 is formed in a substantially hat-like shape in side view so as to protrude to the vehicle lower side. As illustrated in FIG. 3 and FIG. 5, the coupling member 182 is joined to the bottom surface of the bending structure portion 183, the lower surface of the front-side flange portion 184, and the lower surface of the rear-side flange portion 185 in the second roof reinforcement 18, and the inner side wall portion 101b of the roof side inner portion 101, to thereby couple the roof reinforcement main-body member 181 and the roof side inner portion 101 to each other.

As illustrated in FIG. 3, the striker mounting member 23 to which the striker 21 is fixed is joined to the coupling member 182.

As illustrated in FIG. 3 and FIG. 5, the striker mounting member 23 has a substantially box-like shape of which vehicle upper side and vehicle-width-direction outer side are opened, and is joined to the roof side rail 10 and the coupling member 182.

Specifically, as illustrated in FIG. 3 and FIG. 5, the striker mounting member 23 is integrally formed by a substantially box-like main body portion 231 of which the vehicle upper side and vehicle-width-direction outer side are opened, a front-side flange portion 232 is provided so as to extend from the main body portion 231, a rear-side flange portion (not shown), a side flange portion 233, and a lower-side flange portion 234.

As illustrated in FIG. 3 and FIG. 5, the main body portion 231 is integrally formed in a substantially box-like shape by a front surface portion 231a and a rear surface portion (not shown) facing each other in the vehicle front-rear direction, a side surface portion 231b forming a side wall on the vehicle-width-direction inner side, and a bottom surface portion 231c forming the bottom surface.

As illustrated in FIG. 5, the bottom surface portion 231c of the main body portion 231 has a substantially flat plate-like shape having a substantially horizontal lower surface in the vertical cross section along the vehicle width direction, and is formed in substantially the same location as the upper end of the inner lower-side flange portion 101d and the upper end of the outer lower-side flange portion 102e in the roof side rail 10 in the vehicle up-down direction.

As illustrated in FIG. 3 and FIG. 5, a base portion 21a of the striker 21 is joined to the bottom surface portion 231c at a place on the vehicle-width-direction inner side than the substantially center in the vehicle width direction.

Note that the striker 21 is an engaging member that is to be engaged with a latch provided on the rear door Dr in a state in which the rear door Dr is closed, and is provided so as to hang from the bottom surface portion 231c of the striker mounting member 23 toward the lower side.

Specifically, as illustrated in FIG. 3 and FIG. 5, the striker 21 forms the lower portion of a linear member having a substantially portal-like shape of which vehicle upper side is opened in side view into a shape bent to the vehicle-width-direction outer side.

As illustrated in FIG. 3, the front-side flange portion 232 is provided so as to extend in a flange-like shape from the upper edge of the front surface portion 231a of the main body portion 231 to the edge on the vehicle-width-direction outer side thereof. As illustrated in FIG. 3, the front-side flange portion 232 is joined to the bending structure portion 183 of the second roof reinforcement 18 via the coupling member 182 and is joined to the inner side wall portion 101b of the roof side rail 10 via the coupling member 182.

Although detailed illustration is omitted, the rear-side flange portion is provided so as to extend in a flange-like shape from the upper edge of the rear surface portion of the main body portion 231 to the edge on the vehicle-width-direction outer side thereof. The rear-side flange portion is joined to the bending structure portion 183 of the second roof reinforcement 18 via the coupling member 182 and is joined to the inner side wall portion 101b of the roof side rail 10 via the coupling member 182.

As illustrated in FIG. 3 and FIG. 5, the side flange portion 233 is provided so as to extend from the upper end of the side surface portion 231b to the vehicle-width-direction inner side. The side flange portion 233 is joined to the bending structure portion 183 of the second roof reinforcement 18 via the coupling member 182.

As illustrated in FIG. 3 and FIG. 5, the lower-side flange portion 234 is provided so as to extend from the edge of the bottom surface portion 231c on the vehicle-width-direction outer side thereof to the vehicle lower side. As illustrated in FIG. 3 and FIG. 5, the lower-side flange portion 234 is joined to the outer lower-side flange portion 102e of the roof side outer portion 102 via the inner lower-side flange portion 101d of the roof side inner portion 101.

Next, the reinforcement member 22 described above is described in detail. As illustrated in FIG. 4 and FIG. 6, the reinforcement member 22 is a reinforcement member having a length in the vehicle front-rear direction that extends from the rear end of the first roof reinforcement 17 to a place between the second roof reinforcement 18 and the third roof reinforcement 19.

As illustrated in FIG. 4 to FIG. 6, the reinforcement member 22 is formed in a shape obtained by bending a plate-like material having a predetermined thickness so that the plate-like material extends along the surface of the roof side outer portion 102 on the vehicle-width-direction outer side thereof. Note that, as illustrated in FIG. 5, the reinforcement member 22 is joined to the roof side outer portion 102 of the roof side rail 10 so that the lower end is located on the vehicle upper side at a location higher than the joining location between the inner lower-side flange portion 101d of the roof side inner portion 101 and the lower-side flange portion 234 of the striker mounting member 23.

Specifically, as illustrated in FIG. 6, the reinforcement member 22 is integrally formed by a reinforcement main body portion 221 of which the rear end is located in substantially the same location as the rear end of the second roof reinforcement 18, a reinforcement front portion 222 provided by extending the upper portion of the reinforcement main body portion 221 to the vehicle front side, and a reinforcement rear portion 223 provided by extending the lower portion of the reinforcement main body portion 221 to the vehicle rear side.

As illustrated in FIG. 6, the reinforcement main body portion 221 is formed with a length in the vehicle front-rear direction so that the rear end is located in substantially the same location as the rear end of the second roof reinforcement 18 and the front end is located in substantially the center of the place between the first roof reinforcement 17 and the second roof reinforcement 18 in the vehicle front-rear direction.

As illustrated in FIG. 5, the reinforcement main body portion 221 is formed so as to have a cross-sectional shape that overlaps with the outer upper surface portion 102b, the outer side wall portion 102c, and the outer lower surface portion 102d of the roof side outer portion 102 in the vertical cross section along the vehicle width direction.

In more detail, the reinforcement main body portion 221 is integrally formed by a substantially flat plate-like main body upper surface portion 221a along the outer upper surface portion 102b of the roof side outer portion 102, a main body side wall portion 221b provided so as to extend from the main body upper surface portion 221a to the vehicle lower side and slightly to the vehicle-width-direction outer side along the outer side wall portion 102c, and a main body lower surface portion 221c provided so as to extend from the lower end of the main body side wall portion 221b to the vehicle-width-direction inner side and the vehicle lower side along the outer lower surface portion 102d.

As illustrated in FIG. 5 and FIG. 6, by the configuration as above, in the reinforcement main body portion 221, a first main body ridgeline 22A extending to the vehicle front-rear direction is formed in a corner portion between the main body upper surface portion 221a and the main body side wall portion 221b, and a second main body ridgeline 22B extending in the vehicle front-rear direction is formed in a corner portion between the main body side wall portion 221b and the main body lower surface portion 221c.

As illustrated in FIG. 6, the reinforcement front portion 222 is formed with a length in the vehicle front-rear direction so that the rear end is located in substantially the center of the place between the first roof reinforcement 17 and the second roof reinforcement 18 in the vehicle front-rear direction, and the front end is located on the rear end of the first roof reinforcement 17.

As illustrated in FIG. 7, the reinforcement front portion 222 is formed in a cross-sectional shape that overlaps with the outer upper surface portion 102b and the outer side wall portion 102c of the roof side outer portion 102 in the vertical cross section along the vehicle width direction.

In more detail, as illustrated in FIG. 6 and FIG. 7, the reinforcement front portion 222 is formed in a substantially L-shape in cross section by an front-portion upper surface portion 222a provided by extending the main body upper surface portion 221a to the vehicle front side along the outer upper surface portion 102b of the roof side outer portion 102, and a front-portion side wall portion 222b provided by extending the main body side wall portion 221b to the vehicle front side along the outer side wall portion 102c.

As illustrated in FIG. 5 to FIG. 7, the front-portion upper surface portion 222a is formed so as to have substantially the same length as the main body upper surface portion 221a of the reinforcement main body portion 221 in the vehicle width direction in the vertical cross section along the vehicle width direction.

Meanwhile, as illustrated in FIG. 5 to FIG. 7, the front-portion side wall portion 222b is provided so as to extend from the front-portion upper surface portion 222a to the vehicle lower side and slightly to the vehicle-width-direction outer side in an extending length that is shorter than the extending length from the main body upper surface portion 221a to the lower end of the main body side wall portion 221b of the reinforcement main body portion 221 in the vertical cross section along the vehicle width direction.

In other words, the reinforcement front portion 222 is formed so that the length along the outer surface of the roof side outer portion 102 is shorter than the length of the reinforcement main body portion 221 so that the lower end is located on the vehicle upper side than the lower end of the reinforcement main body portion 221 in the cross section along the vehicle width direction.

As illustrated in FIG. 6 and FIG. 7, by the configuration as above, in the reinforcement front portion 222, a front portion ridgeline 22C that extends in the vehicle front-rear direction in the corner portion between the front-portion upper surface portion 222a and the front-portion side wall portion 222b and is continuous with the first main body ridgeline 22A of the reinforcement main body portion 221 is formed.

As illustrated in FIG. 6, the reinforcement rear portion 223 is formed with a length in the vehicle front-rear direction so that the front end is located in substantially the same location as the rear end of the second roof reinforcement 18 in the vehicle front-rear direction, and the rear end is located between the second roof reinforcement 18 and the third roof reinforcement 19.

As illustrated in FIG. 8, the reinforcement rear portion 223 is formed in a cross-sectional shape that overlaps with the outer side wall portion 102c and the outer lower surface portion 102d of the roof side outer portion 102 in the vertical cross section along the vehicle width direction.

In more detail, as illustrated in FIG. 6 and FIG. 8, the reinforcement rear portion 223 is formed in a substantially L-shape in cross section by a rear-portion lower surface portion 223a by extending the main body lower surface portion 221c of the reinforcement main body portion 221 to the vehicle rear side along the outer lower surface portion 102d of the roof side outer portion 102, and a rear-portion side wall portion 223b is provided by extending the main body side wall portion 221b of the reinforcement main body portion 221 to the vehicle rear side along the outer side wall portion 102c.

As illustrated in FIG. 5, FIG. 6, and FIG. 8, the rear-portion lower surface portion 223a is formed so that the length in the vehicle width direction thereof is substantially the same as the main body lower surface portion 221c of the reinforcement main body portion 221 in the vertical cross section along the vehicle width direction.

Meanwhile, as illustrated in FIG. 5, FIG. 6, and FIG. 8, the rear-portion side wall portion 223b is provided so as to extend from the rear-portion lower surface portion 223a to the vehicle upper side and the vehicle-width-direction inner side with an extending length shorter than the extending length from the main body lower surface portion 221c to the upper end of the main body side wall portion 221b in the reinforcement main body portion 221 in the vertical cross section along the vehicle width direction.

In other words, the reinforcement rear portion 223 is formed so that the length along the outer surface of the roof side outer portion 102 is shorter than the length of the reinforcement main body portion 221 so that the upper end is located on the vehicle lower side than the upper end of the reinforcement main body portion 221 in the cross section along the vehicle width direction.

As illustrated in FIG. 6 and FIG. 8, by the configuration as above, in the reinforcement rear portion 223, a rear portion ridgeline 22D that extends in the vehicle front-rear direction in a corner portion between the rear-portion side wall portion 223b and the rear-portion lower surface portion 223a and is continuous with the second main body ridgeline 22B of the reinforcement main body portion 221 is formed.

As illustrated in FIG. 6, the reinforcement member 22 of the abovementioned configuration is joined to the outer upper surface portion 102b of the roof side rail 10 that is a portion that overlaps with the main body upper surface portion 221a of the reinforcement main body portion 221 and the front-portion upper surface portion 222a of the reinforcement front portion 222 in the vehicle up-down direction at joining locations P1 spaced apart from each other by predetermined spaces in the vehicle front-rear direction. In an exemplary embodiment, the predetermined spaces can be the same.

As illustrated in FIG. 6, the reinforcement member 22 is joined to the outer side wall portion 102c of the roof side rail 10 that is a portion that overlaps with the main body side wall portion 221b of the reinforcement main body portion 221, the front-portion side wall portion 222b of the reinforcement front portion 222, and the rear-portion side wall portion 223b of the reinforcement rear portion 223 in the vehicle width direction at joining locations P2 spaced apart from each other by predetermined spaces in the vehicle front-rear direction. In an exemplary embodiment, the predetermined spaces can be the same.

As illustrated in FIG. 6, the reinforcement member 22 is joined to the outer lower surface portion 102d of the roof side rail 10 that is a portion that overlaps with the main body lower surface portion 221c of the reinforcement main body portion 221 and the rear-portion lower surface portion 223a of the reinforcement rear portion 223 in substantially the vehicle up-down direction at joining locations P3 spaced apart from each other by predetermined spaces in the vehicle front-rear direction. In an exemplary embodiment, the predetermined spaces can be the same.

Specifically, the main body upper surface portion 221a of the reinforcement main body portion 221 and the front-portion upper surface portion 222a of the reinforcement front portion 222 are joined to the outer side wall portion 102c of the roof side rail 10 by spot welding after being interposed between electrodes for spot welding in a state of overlapping with the outer side wall portion 102c of the roof side rail 10 in the vehicle up-down direction.

The main body side wall portion 221b of the reinforcement main body portion 221, the front-portion side wall portion 222b of the reinforcement front portion 222, and the rear-portion side wall portion 223b of the reinforcement rear portion 223 are joined to the outer side wall portion 102c of the roof side rail 10 by spot welding after being interposed between the electrodes for spot welding in a state of overlapping with the outer side wall portion 102c of the roof side rail 10 in substantially a vehicle width direction.

The main body lower surface portion 221c of the reinforcement main body portion 221 and the rear-portion lower surface portion 223a of the reinforcement rear portion 223 are joined to the outer lower surface portion 102d of the roof side rail 10 by spot welding after being interposed between the electrodes for spot welding in a state of overlapping with the outer lower surface portion 102d of the roof side rail 10 in substantially a vehicle up-down direction.

Therefore, as illustrated from FIG. 5 to in FIG. 8, in a state in which the reinforcement member 22 is joined to the roof side rail 10, the first main body ridgeline 22A and the front portion ridgeline 22C that are continuous with each other in the vehicle front-rear direction overlap with the first ridgeline 10A of the roof side rail 10 located on the vehicle upper side, and the second main body ridgeline 22B and the rear portion ridgeline 22D that are continuous with each other in the vehicle front-rear direction overlap with the second ridgeline 10B of the roof side rail 10 located on the vehicle-width-direction outer side than the first main body ridgeline 22A.

As described above, the upper vehicle-body structure includes: the pair of left and right roof side rails 10 extending in the vehicle front-rear direction of the vehicle 1; the strikers 21 to which the upper portions of the rear doors Dr of the vehicle 1 are engaged; the second roof reinforcement 18 that couples the left and right roof side rails 10 to each other in the vehicle width direction at substantially same locations as the strikers 21 in the vehicle front-rear direction; the striker mounting members 23 that are joined to the roof side rails 10 and the second roof reinforcement 18 and on which the strikers 21 are mounted; and substantially plate-like reinforcement members 22 that overlap with the roof side rails 10 from the vehicle-width-direction outer sides at substantially same locations as the striker mounting members 23 in the vehicle front-rear direction, and the reinforcement members 22 each have a lower end located on a vehicle upper side at a location higher than a joining location between each of the striker mounting members 23 and each of the roof side rails 10 in a vertical up-down direction from a bottom of the vehicle to a top of the vehicle, and the reinforcement members are joined to the roof side rails 10 in a manner in which the reinforcement members 22 overlap the roof side rails 10 and are external to the external surface of the roof side rails 10. As a result, the increase of the vehicle weight can be suppressed and the bending deformation of the roof side rail 10 to the vehicle-width-direction inner side can be suppressed.

Specifically, the upper vehicle-body structure can suppress the displacement of the roof side rail 10 to the vehicle-width-direction inner side by the reinforcement member 22 that is lighter in weight than a substantially pipe-like shape reinforcement member when the collision load from the side of the vehicle acts on the roof side rail 10 via the striker mounting member 23 by joining the reinforcement member 22 to the roof side rail 10 from the vehicle-width-direction outer side.

At this time, the reinforcement member 22 is joined to the roof side rail 10 that overlaps with the reinforcement member 22 in the vehicle up-down direction. Therefore, the upper vehicle-body structure can cause the collision load from the side of the vehicle to act on the joining location as a shearing force that shears the joining location between the roof side rail 10 and the reinforcement member 22.

In other words, the collision load from the side of the vehicle displaces the roof side rail 10 to the vehicle-width-direction inner side against the joining strength between the roof side rail 10 and the reinforcement member 22. Therefore, the upper vehicle-body structure can effectively suppress the displacement of the roof side rail 10 to the vehicle-width-direction inner side.

As a result, the upper vehicle-body structure can reduce the displacement amount of the roof side rail 10 on the vehicle-width-direction outer side serving as the compressive deformation side more than when the collision load from the side of the vehicle acts on the striker mounting member 23 via the striker 21.

The lower end of the reinforcement member 22 is located on the vehicle upper side at a location higher than the joining location between the striker mounting member 23 and the roof side rail 10, and hence the upper vehicle-body structure can suppress a case where the collision load from the side of the vehicle acting on the striker 21 is directly transmitted to the reinforcement member 22 via the striker mounting member 23.

Therefore, the upper vehicle-body structure can stably transmit the collision load from the side of the vehicle acting on the striker 21 to the second roof reinforcement 18 via the striker mounting member 23.

Therefore, the upper vehicle-body structure can suppress the increase of the vehicle weight and suppress the bending deformation of the roof side rail 10 to the vehicle-width-direction inner side.

The first roof reinforcement 17 that couples the roof side rails 10 to each other in the vehicle width direction at a location more forward of the vehicle than the second roof reinforcement 18 is included, and the reinforcement member 22 includes the reinforcement main body portion 221 having a front end located between the second roof reinforcement 18 and the first roof reinforcement 17, and the reinforcement front portion 222 provided so as to extending from the upper portion of the reinforcement main body portion 221 to the vehicle front side. As a result, the upper vehicle-body structure can suppress the occurrence of the stress concentration caused by providing the reinforcement member 22, and can suppress the bending deformation of the roof side rail 10 due to the collision load from the side of the vehicle and the bending deformation of the roof side rail 10 due to the load from the vehicle upper side.

Specifically, the load from the vehicle upper side may act on the roof side rail 10 not only by the collision load from the side of the vehicle but also by the rollover of the vehicle 1, for example.

In particular, the rigidity of the roof side rail 10 between the second roof reinforcement 18 and the first roof reinforcement 17 is lower than the rigidity of the place surrounding the second roof reinforcement 18 and the place surrounding the first roof reinforcement 17. Therefore, there is a fear that the roof side rail 10 may be deformed so as to be bent to the vehicle lower side by the load from the vehicle upper side.

By the reinforcement main body portion 221 having a front end located between the second roof reinforcement 18 and the first roof reinforcement 17, and the reinforcement front portion 222 provided so as to extend from the upper portion of the reinforcement main body portion 221 to the vehicle front side, the upper vehicle-body structure can improve the rigidity of the roof side rail 10 between the second roof reinforcement 18 and the first roof reinforcement 17.

The reinforcement front portion 222 is provided so as to extend from the upper portion of the reinforcement main body portion 221. Therefore, the upper vehicle-body structure can reinforce a relatively upper portion of the roof side rail 10 between the second roof reinforcement 18 and the first roof reinforcement 17 by the reinforcement member 22. Therefore, the upper vehicle-body structure can stably secure the rigidity of the roof side rail 10 against the load from the vehicle upper side.

The rigidity of the roof side rail 10 can be gradually reduced from the second roof reinforcement 18 to the first roof reinforcement 17, and hence the upper vehicle-body structure can prevent a stress concentration section from being generated between the second roof reinforcement 18 and the first roof reinforcement 17.

Therefore, the upper vehicle-body structure can suppress the occurrence of stress concentration caused by providing the reinforcement member 22, and can suppress the bending deformation of the roof side rail 10 caused by the collision load from the side of the vehicle and the bending deformation of the roof side rail 10 caused by the load from the vehicle upper side.

The roof side rail 10 is formed in a shape having the first ridgeline 10A, the second ridgeline 10B, and the third ridgeline 10C extending in the vehicle front-rear direction, the reinforcement main body portion 221 of the reinforcement member 22 is formed in a shape having the first main body ridgeline 22A and the second main body ridgeline 22B overlapping with the first ridgeline 10A and the second ridgeline 10B, and the reinforcement front portion 222 of the reinforcement member 22 is formed in a shape having the front portion ridgeline 22C, which overlaps with the first ridgeline 10A of the roof side rail 10 so as to be continuous with the first main body ridgeline 22A located on the vehicle upper side. Therefore, the upper vehicle-body structure can stably reinforce the roof side rail 10 in a place between the second roof reinforcement 18 and the first roof reinforcement 17 even with the reinforcement front portion 222 of which cross-sectional area in the vertical cross section along the vehicle width direction is smaller than that of the reinforcement main body portion 221.

Therefore, the upper vehicle-body structure can suppress the stress concentration caused by the collision load from the side of the vehicle and the load from the vehicle upper side, and secure the rigidity of the roof side rail 10 in a more secure manner.

Therefore, the upper vehicle-body structure can suppress the bending deformation of the roof side rail 10 caused by the collision load from the side of the vehicle and the bending deformation of the roof side rail 10 caused by the load from the vehicle upper side in a more secure manner.

Regarding the correspondence among terms, the side door of the present disclosure corresponds to the rear door Dr of the embodiment. Similarly, the engaging member corresponds to the striker 21, the roof reinforcement and the first roof reinforcement correspond to the second roof reinforcement 18, the mounting member corresponds to the striker mounting member 23, the second roof reinforcement corresponds to the first roof reinforcement 17, the plurality of ridgelines correspond to the first ridgeline 10A, the second ridgeline 10B, and the third ridgeline 10C, the plurality of main body ridgelines correspond to the first main body ridgeline 22A and the second main body ridgeline 22B, and the ridgeline located on the vehicle-width-direction inner side corresponds to the first ridgeline 10A. However, the present disclosure is not only limited to the configurations of the abovementioned embodiment, and many embodiments can be obtained.

For example, in the abovementioned embodiment, the side door opening S in the vehicle 1 is covered with the front door Df supported by the hinge pillar 8 so as to be openable and closable and the rear door Dr supported by the side pillar 14 so as to be openable and closable, but the present disclosure is not limited thereto, and the side door opening S may be covered with a front door supported by the hinge pillar 8 so as to be openable and closable and a rear door movable so as to slide in the vehicle front-rear direction.

The latch of the rear door Dr is engaged with the striker 21, but the present disclosure is not limited thereto, and a latch provided on the rear portion of the front door Df may be engaged with the striker. In this case, a center pillar forming a closed cross-section extending in the vehicle up-down direction with the door inner panel is disposed on the rear portion of the front door Df, and the latch is provided in the closed cross-section portion formed by the door inner panel and the center pillar.

The striker 21 with which the latch of the rear door Dr is engaged is described as an engaging member, but the present disclosure is not limited thereto, and the engaging member may be a suitable engaging member as long as the engaging member is a member with which the upper portion of the rear door Dr is engaged.

The second roof reinforcement 18 is formed by the roof reinforcement main-body member 181 and the pair of the coupling members 182, but the present disclosure is not limited thereto, and the second roof reinforcement may be integrally formed by the roof reinforcement main-body member 181 and the coupling members 182.

The striker mounting member 23 is joined to the second roof reinforcement 18, but the present disclosure is not limited thereto, and the striker mounting member 23 may be integrally formed with the second roof reinforcement 18.

REFERENCE SIGNS LIST

1 Vehicle
10 Roof side rail
10A First ridgeline
10B Second ridgeline
10C Third ridgeline
17 First roof reinforcement
18 Second roof reinforcement
21 Striker
22 Reinforcement member
22A First main body ridgeline
22B Second main body ridgeline
22C Front portion ridgeline
23 Striker mounting member
221 Reinforcement main body portion
222 Reinforcement front portion
Dr Rear door

What is claimed is:

1. An upper vehicle-body structure, comprising:
a pair of left and right roof side rails extending in a vehicle front-rear direction of a vehicle;
engaging members to which upper portions of side doors of the vehicle are engaged;
a roof reinforcement that couples the left and right roof side rails to each other in a vehicle width direction at substantially same locations as the engaging members in the vehicle front-rear direction;
mounting members that are joined to the roof side rails and the roof reinforcement and on which the engaging members are mounted; and
reinforcement members that overlap with the roof side rails from vehicle-width-direction outer sides at substantially same locations as the mounting members in the vehicle front-rear direction,
wherein the reinforcement members each have a lower end that is located on a vehicle upper side at a location higher than a joining location between each of the mounting members and each of the roof side rails in a vertical up-down direction from a bottom of the vehicle to a top of the vehicle, and the reinforcement members are joined to the roof side rails in a manner in which the reinforcement members overlap the roof side rails and are external to the external surface of the roof side rails,
wherein when the roof reinforcement is considered to be a first roof reinforcement, the upper vehicle-body structure includes a second roof reinforcement that couples the roof side rails to each other in the vehicle width direction at locations more forward of the vehicle than the first roof reinforcement, wherein each of the reinforcement members comprises:
a reinforcement main body portion having a front end located between the first roof reinforcement and the second roof reinforcement; and
a reinforcement front portion provided so as to extend from an upper portion of the reinforcement main body portion to a vehicle front side.

2. The upper vehicle-body structure according to claim 1, wherein:

the roof side rails are each formed in a shape having a plurality of ridgelines extending in the vehicle front-rear direction;

the reinforcement main body portion of the reinforcement member is formed in a shape having a plurality of main body ridgelines that overlap with the plurality of ridgelines; and the reinforcement front portion of the reinforcement member is formed in a shape having a front portion ridgeline, which is continuous with a main body ridgeline located on the vehicle upper side out of the plurality of main body ridgelines and overlaps with one of the ridgelines of the roof side rail.

3. The upper vehicle-body structure according to claim 1, wherein the reinforcement members are substantially plate-like.

4. The upper vehicle-body structure according to claim 1, wherein the engaging members are two engaging members.

5. The upper vehicle-body structure according to claim 1, wherein the side doors are clamshell type doors.

6. The upper vehicle-body structure according to claim 1, wherein the engaging members are strikers.

7. The upper vehicle-body structure according to claim 2, wherein the plurality of ridgelines are three ridgelines.

8. The upper vehicle-body structure according to claim 1, wherein the reinforcement members are secured to the roof side rails by welding.

9. The upper vehicle-body structure according to claim 1, wherein the welding is spot welding.

10. An upper vehicle-body structure, comprising:
a pair of left and right roof side rails extending in a vehicle front-rear direction of a vehicle;
means for engaging to which upper portions of side doors of the vehicle are engaged;
a roof reinforcement that couples the left and right roof side rails to each other in a vehicle width direction at substantially same locations as the means for engaging in the vehicle front-rear direction;
means for mounting that are joined to the roof side rails and the roof reinforcement and on which the means for engaging are mounted; and
means for reinforcing that overlap with the roof side rails from vehicle-width-direction outer sides at substantially same locations as the means for mounting in the vehicle front-rear direction,
wherein the means for reinforcing each have a lower end that is located on a vehicle upper side at a location higher than a joining location between each of the means for mounting and each of the roof side rails in a vertical up-down direction from a bottom of the vehicle to a top of the vehicle, and the means for reinforcing are joined to the roof side rails in a manner in which the means for reinforcing overlap the roof side rails and are external to the external surface of the roof side rails,
wherein when the roof reinforcement is considered to be a first roof reinforcement, the upper vehicle-body structure includes a second roof reinforcement that couples the roof side rails to each other in the vehicle width direction at locations more forward of the vehicle than the first roof reinforcement, wherein each of the means for reinforcing comprises:
a reinforcement main body portion having a front end located between the first roof reinforcement and the second roof reinforcement; and
a reinforcement front portion provided so as to extend from an upper portion of the reinforcement main body portion to a vehicle front side.

11. The upper vehicle-body structure according to claim 10, wherein:
the roof side rails are each formed in a shape having a plurality of ridgelines extending in the vehicle front-rear direction;
the reinforcement main body portion of the means for reinforcing is formed in a shape having a plurality of main body ridgelines that overlap with the plurality of ridgelines; and
the reinforcement front portion of the means for reinforcing is formed in a shape having a front portion ridgeline, which is continuous with a main body ridgeline located on the vehicle upper side out of the plurality of main body ridgelines and overlaps with one of the ridgelines of the roof side rail.

12. The upper vehicle-body structure according to claim 10, wherein the means for reinforcing are substantially plate-like.

13. The upper vehicle-body structure according to claim 10, wherein the means for engaging are two means for engaging.

14. The upper vehicle-body structure according to claim 10, wherein the side doors are clamshell type doors.

15. The upper vehicle-body structure according to claim 10, wherein the means for engaging are strikers.

16. The upper vehicle-body structure according to claim 11, wherein the plurality of ridgelines are three ridgelines.

17. The upper vehicle-body structure according to claim 10, wherein the means for reinforcing are secured to the roof side rails by welding.

* * * * *